United States Patent Office 3,051,613
Patented Aug. 28, 1962

3,051,613
MIXED ANHYDRIDES OF PHOSPHORUS CONTAINING ACIDS
John P. Chupp, Kirkwood, Mo., assignor to Monsanto Chemical Company, St. Louis, Mo., a corporation of Delaware
No Drawing. Filed June 8, 1960, Ser. No. 34,630
20 Claims. (Cl. 167—22)

This invention relates to new and useful phosphorus containing compounds and to methods of making same. Additionally this invention relates to insecticidal compositions containing the phosphorus containing compounds of this invention as an active ingredient.

The compounds of this invention are mixed anhydrides of phosphorus containing acids which are characterized by the mixed anhydride nucleus

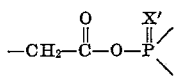

wherein X′ is a chalkogen of atomic weight less than 40 (i.e. sulfur or oxygen). The mixed anhydrides of this invention can be prepared by reacting a salt (e.g. ammonium or alkali metal such as sodium, potassium or lithium salt) of a phosphorothioic acid of the structure

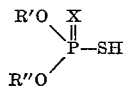

wherein R′ and R″ are like or unlike aliphatic radicals and wherein X is a chalkogen of atomic weight less than 40 with a substantially equimolar amount of an alpha-halo acetyl compound of the structure

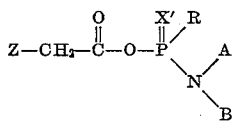

wherein Z is a halogen having an atomic number above 9 but not higher than 35 (i.e. chlorine or bromine), wherein A and B are like or unlike aliphatic radicals, and wherein —R is

or —OR‴ wherein A, B and R‴ are like or unlike aliphatic radicals in the presence of an inert organic liquid or solvent (e.g. benzene, toluene, xylene, acetone, butanone, dioxane, etc.). While a wide range of reaction temperatures can be employed provided the system is fluid (i.e. a temperature above the freezing point of the system up to and including the boiling point of the system) it is preferred to employ a reaction temperature in the range of 20° C. to 120° C. The mixed anhydrides so obtained can be represented by the structure

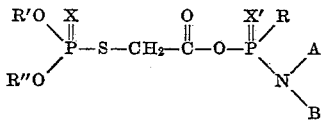

wherein R′, R″, X, X′, R, A and B have the aforedescribed significance. By the expression "aliphatic radical" or aliphatic radicals" as used herein and in the appended claims is meant alkyl and alkenyl radicals, whether substituted or unsubstituted, containing from 1 to 5 carbon atoms and include for example, methyl, ethyl, propyl, isopropyl, butyl, isobutyl, sec. butyl, amyl, isoamyl, allyl, methallyl, chloroethyl, chloropropyl, chlorobutyl, methoxyethyl, ethoxyethyl, ethoxypropyl, methoxybutyl, isopropoxyethyl, 2-chloroallyl, 3-chloroallyl, 3-chloro-2-butenyl, etc. In general it is preferred that "aliphatic radical" or "aliphatic radicals" means aliphatic hydrocarbon radicals containing not more than three carbon atoms (e.g. methyl, ethyl, propyl, isopropyl, allyl, etc.).

As illustrative of the preparation of the mixed anhydrides of this invention is the following:

Example I

To a suitable reaction vessel is charged approximately 20.6 parts by weight (substantially 0.11 mol) of ammonium O,O-diethyl phosphorothioate, approximately 80 parts by weight of acetone, and approximately 27.3 parts by weight (substantially 0.10 mol) of O-ethyl O-(1-oxo-2-chloroethyl) N,N-diethylphosphoroamidothionate. The charge is then refluxed for approximately 3 hours. Thereafter the reaction mass is filtered and the filtrate stripped of acetone under vacuum. The residue is cooled to room temperature and approximately 150 parts by weight of water is added and the mixture is agitated for about 5 minutes. To this mixture is then added approximately 140 parts by weight of methylene chloride and the agitation is continued for about 15 minutes. The mixture is then permitted to stand and the organic layer separated from the aqueous layer. The organic layer is washed with water and then stripped of volatiles by heating to 100° C. at 10 mm. The residue, 30.1 parts by weight of an amber oil, is (diethoxyphosphinylthio)acetic acid O-ethyl N,N-diethylphosphoroamidothionic acid mixed anhydride

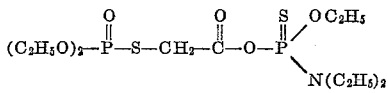

which is soluble in acetone, benzene and ethyl alcohol but insoluble in water. Analysis: Theory 15.7% S. Found 15.8% S.

Example II

Employing the procedure of Example I but replacing ammonium O,O-diethyl phosphorothioate with an equimolar amount of potassium O,O-dimethyl phosphorodithioate there is obtained as an oil (dimethoxyphosphinothioylthio)acetic acid O-ethyl N,N-diethyl phosphoroamidothionic acid mixed anhydride

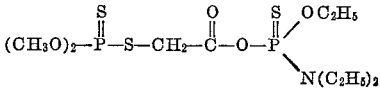

which is soluble in benzene but insoluble in water.

Example III

To a suitable reaction vessel is charged approximately 20.3 parts by weight (substantially 0.10 mol) of ammonium O,O-diethyl phosphorodithioate, approximately 80 parts by weight of acetone, and approximately 25.0 parts by weight (substantially 0.08 mol) of O-ethyl O-(1 - oxo - 2 - chloroethyl) N,N - diallylphosphoroamidate. The charge is refluxed for about 6 hours, cooled to room temperature and filtered. The filter cake is washed with acetone and the washings combined with the original filtrate. This solution is then stripped of acetone under vacuum. The residue is washed with water and the water washings discarded. The so-washed residue is then taken up with methylene chloride and the organic solution washed with water, and the water washings discarded. The so-washed organic solution is then stripped of volatiles by heating to 110° C. at 5 to 10 mm. The residue is (diethoxyphosphinothioylthio)acetic acid O-ethyl N,N-diallylphosphoroamidic acid mixed anhydride

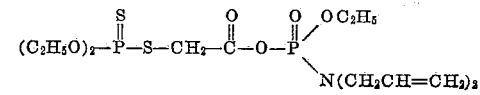

which is an oil soluble in diethylether, acetone, benzene and ethyl alcohol but insoluble in water.

*Example IV*

Employing the procedure of Example I but replacing ammonium O,O-diethyl phosphorothioate with an equimolar amount of ammonium O,O-diethyl phosphorodithioate there is obtained as an amber oil (diethoxyphosphinothioylthio)acetic acid O-ethyl N,N-diethylphosphoroamidothionic acid mixed anhydride

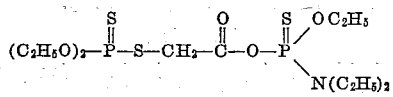

which is soluble in benzene and ethyl alcohol but insoluble in water.

*Example V*

To a suitable reaction vessel is charged approximately 80 parts by weight of acetone, approximately 24 parts by weight of ammonium O,O-diethyl phosphorodithioate and approximately 22.8 parts by weight of O-(1-oxo-2-chloroethyl) N,N,N,N-tetramethylphosphorodiamidate and the charge refluxed for 6 hours. The reaction mass is cooled to room temperature, filtered, and the filtrate stripped of acetone under vacuum. The residue is taken up with methylene chloride and the organic solution washed with water. The so-washed organic solution is then stripped of volatiles by heating to 100° C. at 10 mm. The residue, an oil, is (diethoxyphosphinothioylthio)acetic acid N,N,N,N-tetramethylphosphorodiamidic acid mixed anhydride

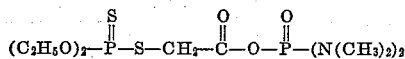

which oil is insoluble in water.

*Example VI*

Employing the procedure of Example V but replacing ammonium O,O-diethyl phosphorodithioate with an equimolar amount of ammonium O,O-diethyl phosphorothioate there is obtained (diethoxyphosphinylthio)acetic acid N,N,N,N-tetramethylphosphorodiamidic acid mixed anhydride, which is a water-insoluble oil.

*Example VII*

To a suitable reaction vessel is charged 24.4 parts by weight of ammonium O,O-diethyl phosphorothioate, approximately 80 parts by weight of acetone, and 30.1 parts by weight of O-ethyl O-(1-oxo-2-chloroethyl) N,N-dipropylphosphoroamidothionate and the charge refluxed for 6 hours. The reaction mass is cooled to room temperature, filtered and the filtrate stripped of acetone under vacuum. The residue is taken up with methylene chloride and the organic solution washed with water. The so-washed organic solution is then stripped of volatiles by heating to 100° C. at 10 mm. The residue, an oil, is (diethoxyphosphinylthio)acetic acid O-ethyl N,N-dipropylphosphoroamidothionic acid mixed anhydride, which oil is soluble in benzene and ethanol but insoluble in water.

*Example VIII*

Employing the procedure of Example VII but replacing O-ethyl O-(1-oxo-2-chloroethyl) N,N-diproplyphosphoroamidothionate with an equimolar amount of O-ethyl O-(1-oxo-2-chloroethyl) N,N-dipropylphosphoroamidate there is obtained (diethoxyphosphinylthio)acetic acid O-ethyl N,N-dipropylphosphoroamidic acid mixed anhydride, an oil which is soluble in benzene but insoluble in water.

*Example IX*

Employing the procedure of Example V but replacing O-(1-oxo-2-chloroethyl) N,N,N,N-tetramethylphosphorodiamidate with an equimolar amount of O-(1-oxo-2-chloroethyl) N,N,N,N - tetraethylphosphorodiamidate there is obtained (diethoxyphosphinothioylthio)acetic acid N,N,N,N-tetraethylphosphorodiamidic acid mixed anhydride, an amber oil which is soluble in benzene and ethyl alcohol, but insoluble in water.

*Example X*

To a suitable reaction vessel is charged approximately 80 parts by weight of acetone, 20.6 parts by weight of ammonium O,O-diethyl phosphorothioate, and 28.4 parts by weight of O-(1-oxo-2-chloroethyl) N,N,N,N-tetraethylphosphorodiamidate and the charge refluxed for 6 hours. The reaction mass is cooled to room temperature, filtered and the filtrate stripped of acetone under vacuum. The residue is taken up with methylene chloride and the organic solution washed with water. The so-washed organic solution is then stripped of volatiles by heating to 100° C. at 10 mm. The desidue is (diethoxyphosphinylthio)acetic acid N,N,N,N-tetraethylphosphorodiamidic acid mived anhydride, an amber oil which is soluble in benzene and ethyl alcohol but insoluble in water.

*Example XI*

Employing the procedure of Example X but replacing O-(1-oxo-2-chloroethyl) N,N,N,N-tetraethylphosphorodiamidate with an equimolar amount of O-(1-oxo-2-chloroethyl) N,N,N,N - tetrapropylphosphorodiamidothionate there is obtained as an amber oil, (diethoxyphosphinylthio)acetic acid N,N,N,N-tetrapropylphosphorodiamidothionic acid mixed anhydride, which oil is soluble in chloroform and ethyl acetate but insoluble in water.

*Example XII*

Employing the procedure of Example V but replacing ammonium O,O-diethyl phosphorodithioate with an equimolar amount of potassium O,O-di(2-ethoxyethyl) phosphorodithioate there is obtained [bis(2-ethoxyethoxy)phosphinothioylthio]acetic acid N,N,N,N-tetramethylphosphorodiamidic acid mixed anhydride

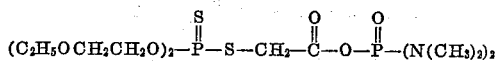

which is soluble in benzene but insoluble in water.

*Example XIII*

Employing the procedure of Example X but replacing O-(1-oxo-2 - chloroethyl) N,N,N,N-tetraethylphosphorodiamidate with an equimolar amount of O-(1-oxo-2-bromoethyl) N,N,N,N-tetra(2-chloroethyl)phosphorodiamidate there is obtained (diethoxyphosphinylthio)acetic acid N,N,N,N - tetra(2 - chloroethyl)phosphorodiamidic acid mixed anhydride

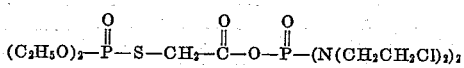

which is insoluble in water.

*Example XIV*

Employing the procedure of Example I but replacing ammonium O,O-diethyl phosphorothioate with an equimolar amount of sodium O,O-diisoamyl phosphorodithioate there is obtained (diisoamyloxyphosphinothioylthio)acetic acid O-ethyl N,N-diethylphosphoroamidothionic acid mixed anhydride which is insoluble in water.

*Example XV*

Employing the procedure of Example III but replacing O-ethyl O-(1-oxo-2-chloroethyl) N,N-diallylphosphoroamidate with an equimolar amount of O-n-butyl O-(1-oxo-2-bromoethyl) N,N-bis(3-chloroallyl)phosphoroamidate there is obtained (diethoxyphosphinothioylthio)acetic acid O-n-butyl N,N-bis(3-chloroallyl) phosphoramidic acid mixed anhydride, which is insoluble in water.

Example XVI

Employing the procedure of Example I but replacing ammonium O,O-diethyl phosphorothioate with an equimolar amount of ammonium O,O-di(2-chloroethyl) phosphorodithioate there is obtained [bis(2-chloroethyl)phosphinothioylthio]acetic acid O-ethyl N,N-diethylphosphoroamidothionic acid which is soluble in benzene but insoluble in water.

Example XVII

Employing the procedure of Example X but replacing O-(1-oxo-2-chloroethyl) N,N,N,N-tetraethylphosphorodiamidate with an equimolar amount of O-(1-oxo-2-chloroethyl) N,N,N,N-tetrapropylphosphorodiamidate there is obtained (diethoxyphosphinylthio)acetic acid N,N,N,N-tetrapropylphosphorodiamidic acid mixed anhydride an amber oil which is soluble in benzene and chloroform but insoluble in water.

Example XVIII

Employing the procedure of Example X but replacing O,O-diethyl ammonium phosphorothioate with an equimolar amount of potassium O,O-diisopropyl phosphorodithioate there is obtained (diethoxyphosphinothioylthio)acetic acid N,N,N,N-tetraethylphosphorodiamidic acid mixed anhydride which is soluble in benzene but insoluble in water.

In the process of this invention any inert organic liquid or solvent can be used. The methods by which the mixed anhydrides of this invention are isolated will vary slightly with the reactants employed and the product produced. Further purification by selective solvent extraction or by absorptive agents such as activated carbon or clays can precede the removal of the inert organic liquid or solvent. However, the product is generally satisfactory for insecticidal purposes without further purification.

It will be understood that the terms "insect" and "insecticide" are used herein in their broad common usage to include spiders, mites, ticks, and like pests which are not in the strict biological sense classed as insects. Thus the usage herein conforms to the definitions provided by Congress in Public Law 104, the "Federal Insecticide, Fungicide, and Rodenticide Act" of 1947, Section 2, subsection h, wherein the term "insect" is used to refer not only to those small invertebrate animals belonging mostly to the class Insecta, comprising six-legged usually winged forms, as beetles, bugs, bees, flies, and so forth, but also to other allied classes of arthropods whose members are wingless and usually have more than six legs, as spiders, mites, ticks, centipedes, and wood lice.

The mixed anhydrides of this invention are effective against a wide variety of insect pests. As illustrative of the activity but not limitative thereof is the following:

One gram of the product of Example I [i.e. (diethoxyphosphinylthio)acetic acid O-ethyl N,N-diethylphosphoroamidothionic acid mixed anhydride] is dissolved in sufficient acetone to make a concentrate solution thereof. Approximately 0.1 cc. of sorbitan monolaurate polyoxyethylene derivative (a commercial water-soluble non-ionic emulsifying agent containing 20 moles of ethylene oxide per mole of sorbitan monolaurate) is then mixed with the concentrate. To this mixture and with agitation is added sufficient water to provide an aqueous emulsion having a concentration of 0.1% by weight of the said product of Example I. Thereupon lima bean plant leaves previously infested with the two-spotted spider mite, *Tetranychus telarious* (L.), are dipped in the aqueous emulsion, withdrawn, and set aside for observation. At the end of 48 hours, a 100% kill of the mobile stage of the mite is noted. Seven days after setting the test specimen aside, residual activity is confirmed, a 100% kill of both the resting stage and the ova stage being noted. Similar results against the mobile, resting and ova stages of the same mite are obtained employing the respective mixed anhydrides of Examples II, III, IV, V, VII, VIII, IX, X, XI and XVII at the same concentration.

Employing the mixed anhydrides of Examples I, III, IV, V, VII, VIII, IX, X, XI and XVII, respectively, at concentrations of 10 p.p.m. against yellow fever mosquito larvae, *Aedes aegypti*, 100% kills are observed.

One gram of the mixed anhydride of Example X [i.e. (diethoxyphosphinylthio)acetic acid N,N,N,N-tetraethylphosphorodiamidic acid mixed anhydride] is dissolved in sufficient acetone to make a concentrated solution thereof. Approximately 0.1 cc. of sorbitan monolaurate polyoxyethylene derivative (a commercial water-soluble non-ionic emulsifying agent) is then mixed with the concentrate. To this mixture and with agitation is added sufficient water to provide an aqueous emulsion having a concentration of 0.001% by weight of said mixed anhydride of Example X. Thereupon Black Valentine bean plant leaves are dipped in the aqueous emulsion, and the dipped leaves are set aside to dry at room temperature. The dry leaves are then infested with the larvae of the Mexican bean beetle, *Epilachna varivestis* Mulsant, and the infested leaves placed in an insectary maintained at 77° F. After 48 hours a 100% kill of the beetle is noted. Employing the same tests but using the respective mixed anhydrides of Examples I, II, III, IV, V, VII, VIII, IX, XI, XII and XVII at respective concentrations of 0.004% by weight 100% kills are noted after 48 hours.

The mixed anhydrides of this invention are also effective as systemic insecticides against the two-spotted spider mite, *Tetranychus telarius*, and adult cotton aphids at low concentrations. In general the mixed anhydrides of this invention are non-phytotoxic.

Although the mixed anhydrides of this invention are useful per se in controlling a wide variety of insect pests, it is preferable that they be supplied to the pests or to the environment of the pest or pests in a dispersed form in a suitable extending agent.

In the instant specification and appended claims it is to be understood that the term "dispersed" is used in its widest possible sense. When it is said that the mixed anhydrides of this invention are dispersed, it means that the particles of the mixed anhydrides of this invention may be molecular in size and held in true solution in a suitable organic solvent. It means further that the particles may be colloidal in size and distributed throughout a liquid phase in the form of suspensions or emulsions or in the form of particles held in suspension by wetting agents. It also includes particles which are distributed in a semi-solid viscous carrier such as petrolatum or soap or other ointment base in which they may be actually dissolved in the semi-solid or held in suspension in the semi-solid with the aid of suitable wetting or emulsifying agents. The term "dispersed" also means that the particles may be mixed with and distributed throughout a solid carrier providing a mixture in particulate form, e.g. pellets, granules, powders, or dusts. The term "dispersed" also includes mixtures which are suitable for use as aerosols including solutions, suspensions, or emulsions of the mixed anhydrides of this invention in a carrier such as dichlorodifluoromethane and like fluorochloroalkanes which boil below room temperature at atmospheric pressure.

In the instant specification and appended claims it is to be understood that the expression "extending agent" includes any and all of those substances in which the mixed anhydrides of this invention are dispersed. It includes, therefore, the solvents of a true solution, the liquid phase of suspensions, emulsions or aerosols, the semi-solid carrier of ointments and the solid phase of particulate solids, e.g. pellets, granules, dusts and powders.

The exact concentration of the mixed anhydrides of this invention employed in combatting or controlling insect pests can vary considerably provided the required dosage (i.e. toxic or lethal amount) thereof is supplied to the pests or to the environment of the pests. When the extending agent is a liquid or mixture of liquids (e.g. as in solutions, suspensions, emulsions, or aerosols) the concentration of the mixed anhydride employed to supply the desired dosage generally will be in the range of 0.001 to 50 percent by weight. When the extending agent is a solid or semi-solid, the concentration of the mixed anhydride employed to supply the desired dosage generally will be in the range of 0.1 to 25 percent by weight. From a practical point of view, the manufacturer must supply the agriculturist with a low-cost concentrate or spray base or particulate solid base in such form that, by merely mixing with water or solid extender (e.g., powdered clay or talc) or other low cost material available to the agriculturist at the point of use he will have an easily prepared insecticidal spray or particulate solid. In such a concentrate composition, the mixed anhydride generally will be present in a concentration of 5 to 95 percent by weight, the residue being any one or more of the well known insecticidal adjuvants, such as the various surface active agents (e.g. detergents, a soap or other emulsifying or wetting agent), surface active clays, solvents, diluents, carrier media, adhesives, spreading agents, humectants, and the like.

There are a large number of organic liquids which can be used for the preparation of solutions, suspensions or emulsions of the mixed anhydrides of this invention. For example, isopropyl ether, acetone, methyl ethyl ketone, dioxane, cyclohexanone, carbon tetrachloride, ethylene dichloride, tetrachloroethane, hexane, heptane and like higher liquid alkanes, hydrogenated naphthalenes, solvent naphtha, benzene, toluene, xylene, petroleum fractions (e.g. those boiling almost entirely under 400° F., and having a flash point above about 80° F., particularly kerosene), mineral oils having an unsulfonatable residue above about 80 percent and preferably above about 90 percent. In those instances wherein there may be concern about the phytotoxicity of the organic liquid extending agent a portion of same can be replaced by such low molecular weight aliphatic hydrocarbons as dipentene, diisobutylene, propylene trimer and the like, or suitable polar organic liquids such as the aliphatic ethers and the aliphatic ketones containing not more than about 10 carbon atoms as exemplified by acetone, methyl ethyl ketone, diisobutyl ketone, dioxane, isopropyl ether, and the like. In certain instances, it is advantageous to employ a mixture of organic liquids as the extending agent.

When the mixed anhydrides of this invention are to be supplied to the insect pests or to the environment of the pests as aerosols, it is convenient to dissolve them in a suitable solvent and disperse the resulting solution in dichlorodifluoromethane or like chlorofluoroalkane which boils below room temperature at atmospheric pressure.

The mixed anhydrides of this invention are preferably supplied to the insect pests or to the environment of the insect pests in the form of emulsions or suspensions. Emulsions or suspensions are prepared by dispersing the mixed anhydride of this invention either per se or in the form of an organic solution thereof in water with the aid of a water-soluble surfactant. The term "surfactant" as employed here and in the appended claims is used as in Volume II of Schwartz, Perry and Berch's "Surface Active Agents and Detergents" (1958, Interscience Publishers, Inc., New York) in place of the expression "emulsifying agent," to connote generically the various "emulsifying agents," "dispersing agents," "wetting agents" and "spreading agents" that are adapted to be admixed with the active compounds of this invention in order to secure better wetting and spreading of the active ingredients in the water vehicle or carrier in which they are insoluble through lowering the surface tension of the water (see also Frear "Chemistry of Insecticides, Fungicides and Herbicides," second edition page 280). These surfactants include the well-known capillary active substances which may be anion-active (or anionic), cation active (or cationic), or non-ionizing (or non-ionic) which are described in detail in Volumes I and II of Schwartz, Perry and Berch's "Surface Active Agents and Detergents" (1958, Interscience Publishers, Inc., New York) and also in the November 1947 issue of Chemical Industries (pages 811–824) in an article entitled "Synthetic Detergents" by John W. McCutcheon and also in the July, August, September and October 1952 issues of Soap and Sanitary Chemicals under the title "Synthetic Detergents." The disclosures of these articles with respect to surfactants, i.e. the anion-active, cation-active and non-ionizing capillary active substances are incorporated in this specification by reference in order to avoid unnecessary enlargement of this specification. The preferred surfactants are the water-soluble anionic surface-active agents and the water-soluble non-ionic surface-active agents set forth in U.S. 2,846,398 (issued August 5, 1958). In general it is preferred that a mixture of water-soluble anionic and water soluble non-ionic surfactants be employed.

The mixed anhydrides of this invention can be dispersed by suitable methods (e.g., tumbling or grinding) in solid extending agents either of organic or inorganic nature and supplied to the insect pests environment in particulate form. Such solid materials include for example, tricalcium phosphate, calcium carbonate, kaolin, bole, kieselguhr, talc, bentonite, fuller's earth, pyrophillite, diatomaceous earth, calcined magnesia, volcanic ash, sulfur and the like inorganic solid materials, and include for example, such materials of organic nature as powdered cork, powdered wood, and powdered walnut shells. The preferred solid carriers are the adsorbent clays, e.g. bentonite. These mixtures can be used for insecticidal purposes in the dry form, or by addition of water-soluble surfactants or wetting agents the dry particulate solids can be rendered wettable by water so as to obtain stable aqueous dispersions or suspensions suitable for use as sprays.

For special purposes the mixed anhydrides of this invention can be dispersed in a semi-solid extending agent such as petrolatum or soap (e.g. sodium stearate or oleate or palmitate or mixtures thereof) with or without the aid of solubility promotors and/or surfactants or dispersing agents.

In all of the forms described above the dispersions can be provided ready for use in combatting insect pests or they can be provided in a concentrated form suitable for mixing with or dispersing in other extending agents. As illustrative of a particularly useful concentrate is an intimate mixture of mixed anhydride of this invention with a water-soluble surfactant which lowers the surface tension of water in the weight proportions of 0.1 to 15 parts of surfactant with sufficient of the mixed anhydride of this invention to make 100 parts by weight. Such a concentrate is particularly adapted to be made into a spray for combatting various forms of insect pests by the addition of water thereto. As illustrative of such a concentrate is an intimate mixture of 95 parts by weight of the mixed anhydride of Example XVII and 5 parts by weight of a water-soluble non-ionic surfactant such as the polyoxyethylene derivative of sorbitan monolaurate.

Another useful concentrate adapted to be made into a spray for combatting insect pests (particularly mites) is a solution (preferably as concentrated as possible) of a mixed anhydride of this invention in an organic solvent therefor. The said liquid concentrate preferably contains dissolved therein a minor amount (e.g., 0.5 to 10 percent by weight of the weight of the new insecticidal agent) of a surfactant (or emulsifying agent), which surfactant is also water-soluble. As illustrative of such a concentrate is a solution of the mixed anhydride of Example X in benzene which solution contains dissolved therein a water-soluble polyoxyethylene glycol non-ionic surfactant and a water-soluble alkylaryl sulfonate anionic surfactant.

Of the surfactants aforementioned in preparing the various emulsifiable, wettable or dispersible compositions or concentrates of this invention, the anionic and non-ionic surfactants are preferred. Of the anionic surfactants, the particularly preferred are the well-known water-soluble alkali metal alkylaryl sulfonates as exemplified by sodium decylbenzene sulfonate and sodium dodecylbenzene sulfonate. Of the non-ionic surfactants, the particularly preferred are the water-soluble polyoxyethylene derivatives of alkylphenols (particularly isooctylphenol) and the water-soluble polyoxyethylene derivatives of the mono-higher fatty acid esters of sorbitan containing 15 to 30 moles of ethylene oxide per mole of sorbitan mono-ester or alkylphenol.

In all of the various dispersions described hereinbefore, for insecticidal purposes, the active ingredient can be one or more of the compounds of this invention. The compounds of this invention can also be advantageously employed in combination with other pesticides, including, for example, nematocides, bactericides, and herbicides. In this manner it is possible to obtain mixtures which are effective against a wide variety of pests and other forms of noxious life.

In controlling or combatting insect pests the mixed anhydrides of this invention either per se or compositions comprising same are supplied to the insect pests or to their environment in a lethal or toxic amount. This can be done by dispersing the new insecticidal agent or insecticidal composition comprising same, in, on or over an infested environment or in, on or over an environment the insect pests frequent, e.g., agricultural soil or other growth media or other media infested with the insect pests or attractable to the pests for habitational or sustenance or propagational purposes, in any conventional fashion which permits contact between the insect pests and the mixed anhydride of this invention. Such dispersing can be brought about by applying sprays or particulate solid compositions to a surface infested with the insect pests or attractable to the pests, as for example, the surface of an agricultural soil or other media such as the above ground surface of plants by any of the conventional methods, e.g. power dusters, boom and hand sprayers and spray dusters. Also for sub-surface application such dispersing can be carried out by simply mixing the new insecticidal agent per se or insecticidal spray or particulate solid composition comprising same with the infested environment or with the environment the insect pests frequent, or by employing a liquid carrier for the new insecticidal agent to accomplish sub-surface penetration and impregnation therein.

While this invention has been described with respect to certain embodiments, it is to be understood that it is not so limited and that variations and modifications thereof obvious to those skilled in the art can be made without departing from the spirit and scope thereof.

What is claimed is:

1. Mixed anhydrides of the structure $$\begin{array}{c}R'O\\ \phantom{R'O}\diagdown\\ \phantom{R'O}\phantom{aa}P-S-CH_2-C-O-P\phantom{aa}\diagup A\\ \phantom{R'O}\diagup\phantom{aaaaaaaaaaaaaaaaaa}\diagdown\\ R''O\phantom{aaaaaaaaaaaaaaaaaaaaaaa}N\\ \phantom{aaaaaaaaaaaaaaaaaaaaaaaaaaaa}\diagdown B\end{array}$$

with P bearing X (double bond) and the right P bearing X' and R, wherein X and X' are chalkogens of atomic weight less than 40, wherein —R is selected from the group consisting of —OR''' and $$-N\diagup^A_{\diagdown B}$$

and wherein R', R'', R''', A and B, respectively, contain from 1 to 5 carbon atoms and are selected from the group of aliphatic radicals consisting of alkyl, alkenyl, chloroalkyl, chloroalkenyl and alkoxyalkyl.

2. Mixed anhydrides of claim 1 wherein X' is oxygen and wherein —R is $$-N\diagup^A_{\diagdown B}$$

3. Mixed anhydrides of the structure $$\begin{array}{c}R'O\phantom{a}X\phantom{aaaaaaaaaaa}O\phantom{aaa}O\\ \phantom{R'O}\diagdown\phantom{a}\|\phantom{aaaaaaaaaaa}\|\phantom{aaa}\|\\ \phantom{R'O}\phantom{aa}P-S-CH_2-C-O-P\phantom{aa}(N\diagup^A_{\diagdown B})_2\\ R''O\diagup\end{array}$$

wherein X is a chalkogen of atomic weight less than 40 and wherein R', R'', A and B are aliphatic hydrocarbon radicals free of acetylenic unsaturation and containing not more than 3 carbon atoms.

4.
$$(C_2H_5O)_2-\overset{O}{\underset{\|}{P}}-S-CH_2-\overset{O}{\underset{\|}{C}}-O-\overset{O}{\underset{\|}{P}}-(N(C_2H_5)_2)_2$$

5.
$$(C_2H_5O)_2-\overset{S}{\underset{\|}{P}}-S-CH_2-\overset{O}{\underset{\|}{C}}-O-\overset{O}{\underset{\|}{P}}-(N(C_2H_5)_2)_2$$

6.
$$(C_2H_5O)_2-\overset{O}{\underset{\|}{P}}-S-CH_2-\overset{O}{\underset{\|}{C}}-O-\overset{O}{\underset{\|}{P}}-(N(C_3H_7)_2)_2$$

7.
$$(C_2H_5O)_2-\overset{O}{\underset{\|}{P}}-S-CH_2-\overset{O}{\underset{\|}{C}}-O-\overset{O}{\underset{\|}{P}}\diagup^{OC_2H_5}_{\diagdown N(n-C_3H_7)_2}$$

8.
$$(C_2H_5O)_2-\overset{O}{\underset{\|}{P}}-S-CH_2-\overset{O}{\underset{\|}{C}}-O-\overset{O}{\underset{\|}{P}}\diagup^{OC_2H_5}_{\diagdown N(C_2H_5)_2}$$

9. The method of making the mixed anhydrides of the structure $$\begin{array}{c}R'O\phantom{a}X\phantom{aaaaaaaaaaa}O\phantom{aaa}X'\phantom{a}R\\ \phantom{R'O}\diagdown\phantom{a}\|\phantom{aaaaaaaaaaa}\|\phantom{aaa}\|\phantom{a}\diagup\\ \phantom{R'O}\phantom{aa}P-S-CH_2-C-O-P\phantom{aa}\diagup A\\ R''O\diagup\phantom{aaaaaaaaaaaaaaaaaaaaa}N\\ \phantom{aaaaaaaaaaaaaaaaaaaaaaaaaaaa}\diagdown B\end{array}$$

wherein X and X' are chalkogens of atomic weight less than 40, wherein —R is selected from the group consisting of —OR''' and $$-N\diagup^A_{\diagdown B}$$

and wherein R', R'', R''', A and B, respectively, contain from 1 to 5 carbon atoms and are selected from the group of aliphatic radicals consisting of alkyl, alkenyl, chloroalkyl, chloroalkenyl and alkoxyalkyl, which comprises reacting a salt selected from the class consisting of ammonium and alkali metal salts of a phosphorothioic acid of the structure $$\begin{array}{c}R'O\phantom{a}X\\ \phantom{R'O}\diagdown\phantom{a}\|\\ \phantom{R'O}\phantom{aa}P-SH\\ R''O\diagup\end{array}$$

wherein R', R'' and X have the same significance as above-described with a substantially equimolar amount of an alpha-halo acetyl compound of the structure $$Z-CH_2-\overset{O}{\underset{\|}{C}}-O-\overset{X'}{\underset{\|}{P}}\diagup^R_{\diagup A}_{\diagdown N}_{\phantom{aa}\diagdown B}$$

wherein X', R, A and B have the same significance as above-described and wherein Z is a halogen having an atomic number above 9 but not higher than 35 in the presence of an inert organic liquid.

10. The method for protection of plants against insect attack which comprises applying to the plant an insecticidal amount of at least one compound of claim 1.

11. An insecticidal composition comprising a compound of claim 1 dispersed in an extending agent.

12. An insecticidal composition comprising a compound of claim 1 dispersed in an extending agent, the composition containing 0.1 to 25 percent by weight of said compound of claim 1, the extending agent being selected from the group consisting of solid and semi-solid extending agents.

13. An insecticidal composition comprising a compound of claim 1 dispersed in a liquid extending agent, the composition containing 0.001 to 50 percent by weight of said compound of claim 1.

14. An insecticidal composition comprising a compound of claim 2 dispersed in an adsorbent clay, the composition containing 0.1 to 25 percent by weight of said compound of claim 2.

15. An insecticidal composition comprising a compound of claim 2 and an insecticidal adjuvant, said concentrate containing from 5 to 95 percent by weight of the compound of claim 2.

16. An insecticidal concentrate comprising a compound of claim 2 dispersed in an organic solvent therefor and having dissolved therein a minor amount of a surfactant, said concentrate forming an emulsion with water upon agitation therewith.

17. An insecticidal concentrate adapted to be made into a sprayable composition by the addition of water comprising a compound of claim 2 in admixture with a water-soluble surfactant in the weight proportion of 0.1 to 15 parts of surfactant and sufficient of said compound of claim 2 to make 100 parts by weight.

18. The method of controlling insects which comprises contacting the insects with a toxic amount of a compound of claim 1.

19. The method of controlling insects which comprises contacting the insects with a toxic amount of a compound of claim 2.

20. The method of making the mixed anhydrides of the structure

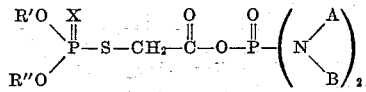

wherein X is chalkogen of atomic weight less than 40 and wherein R′, R″, A and B are aliphatic hydrocarbon radicals free of acetylenic unsaturation and containing not more than 3 carbon atoms which comprises reacting an ammonium salt of a phosphorothioic acid of the structure

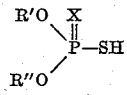

wherein R′, R″ and X have the above-described significance with a substantially equimolar amount of an alpha-chloro acetyl compound of the structure

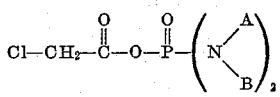

wherein A and B have the above-described significance in the presence of an inert, organic liquid.

No references cited.